(12) United States Patent
Bockes

(10) Patent No.: US 6,779,221 B2
(45) Date of Patent: Aug. 24, 2004

(54) WASHER FOR CANOPY/CAB TRUCK WINDOWS

(76) Inventor: Steven M. Bockes, 850 Hope Ave. NW., Salem, OR (US) 97304

( * ) Notice: Subject to any disclaimer, the term of this patent is extended or adjusted under 35 U.S.C. 154(b) by 0 days.

(21) Appl. No.: 10/281,130

(22) Filed: Oct. 28, 2002

(65) Prior Publication Data

US 2004/0078912 A1 Apr. 29, 2004

(51) Int. Cl.⁷ .............................. A47L 1/06; A46B 5/02; A46B 17/04
(52) U.S. Cl. .................... 15/160; 15/143.1; 15/206; 15/247
(58) Field of Search ................. 15/143.1, 160, 15/164, 206, 247, 211; D4/132, 133, 138

(56) References Cited

U.S. PATENT DOCUMENTS

| | | | |
|---|---|---|---|
| 519,948 A | * | 5/1894 | Hahn .......................... 15/164 |
| 897,286 A | * | 9/1908 | Haskell ....................... 15/247 |
| RE17,249 E | * | 3/1929 | Jackson ...................... D4/132 |
| D104,904 S | * | 6/1937 | Ryan ........................... D4/132 |
| 2,249,559 A | * | 7/1941 | Hilty ........................... 15/247 |
| 2,561,240 A | * | 7/1951 | Spearman ................... 15/164 |
| 2,704,375 A | * | 3/1955 | Haeusser ................. 15/104.94 |
| 2,942,287 A | * | 6/1960 | Parmet ........................ 15/247 |
| 3,862,461 A | * | 1/1975 | Bucklitzsch ................ 15/164 |
| 3,945,736 A | | 3/1976 | Rittenbaum et al. |
| 4,197,608 A | * | 4/1980 | Holley et al. .................. 15/27 |
| 4,704,758 A | | 11/1987 | Hoffman |
| 5,161,279 A | | 11/1992 | Sager et al. |
| 5,373,601 A | | 12/1994 | Miller |
| D360,986 S | * | 8/1995 | Hoagland ................... D4/138 |
| D374,557 S | | 10/1996 | Whitaker |
| 5,797,158 A | * | 8/1998 | Hoshizaki et al. ......... 15/167.1 |
| D404,863 S | | 1/1999 | Flohs |
| 5,920,944 A | | 7/1999 | Biggs et al. |
| 6,052,858 A | | 4/2000 | Drakulic |
| 6,122,792 A | * | 9/2000 | Roy .......................... 15/104.2 |
| 6,134,738 A | | 10/2000 | Weber et al. |
| 6,192,543 B1 | | 2/2001 | Lee |
| D448,176 S | | 9/2001 | Petner |
| D449,910 S | | 10/2001 | Hendricks |
| 2001/0010106 A1 | * | 8/2001 | Lenaghan ................. 15/210.1 |

* cited by examiner

Primary Examiner—Randall Chin
(74) Attorney, Agent, or Firm—Richard C. Litman

(57) ABSTRACT

A cleaning device for cleaning window surfaces in the narrow space between a truck cab and canopy, for example. The device has a cylindrical shaped brush head and an elongated rod with an offset hand grip, and functions by either rotating the rod on its axis or by the forward and backward motion of the rod. The cylindrical brush head is of a circumference adapted to the narrow space between the truck cab and its associated canopy. A cleaning mitt may be provided, and covers the brush head to provide a non-abrasive cleaning surface.

2 Claims, 3 Drawing Sheets

US 6,779,221 B2

WASHER FOR CANOPY/CAB TRUCK WINDOWS

BACKGROUND OF THE INVENTION

1. Field of the Invention

The present invention relates to cleaning devices and, more particularly to a cleaning apparatus for cleaning window surfaces in the narrow space between a truck cab and canopy.

2. Description of the Related Art

Washing devices are well known and have been used to clean the glass surfaces on cars and campers since the advent of the automobile and truck. An elongated resilient handle is often associated with the cleaning device so it may be extended and manipulated to access hard to reach surfaces.

U.S. Pat. No. 5,161,279 issued to Sager et al. discloses a cleaning device with an elongated head member having scrubber material and a rigid elongated straight handle. U.S. Pat. No. Des. 404,863 issued to Flohs in 1999 discloses a long handled scrubbing device specifically for cleaning the space between a cap and cab of a truck. U.S. Pat. No. D449,910 issued to Hendricks in 2002 discloses another ornamental design for a sponge device with a long handle for cleaning between narrow spaces.

A disadvantage of the present cleaning devices is that they are limited to flat surfaces and do not offer a solution for cleaning hard to reach nooks and crannies. These devices function by dragging or pushing the device over a surface, whereas in situations where space and lateral movement is limited, a rotatable cylindrical brush would be more effective.

Cleaning devices with ergonomic handles for minimizing user effort and maximizing performance are also well known in the art. U.S. Pat. No. 4,704,758 issued to Hoffman in 1987 discloses a handle construction for long handled implements consisting of offset hand grips and an elongated shaft member. U.S. Pat. No. 5,920,944 issued to Biggs et al. in 1999 discloses a mop handle having an offset between its ends and a rotatable swivel grip on one end for more efficient use.

Cloth mitts for less abrasive washing of surfaces are also known in the related art. U.S. Pat. No. 5,373,601 issued to Miller in 1994 discloses a vehicle washing mitt having a tubular sleeve of non-abrasive material for wiping a vehicle with cleaning materials. U.S. Pat. No. 3,945,736 issued to Rittenbaum et al. in 1976 discloses an extension mop and mitt consisting of a chenille-like fabric with an open pocket which is closed by a foldable flap and is disclosed to be especially useful for washing automobiles, windows and for applications where extension is necessary. Finally U.S. Pat. No. 6,192,543, issued to Lee in 2001 discloses a hand held cleaning mitt with a supplemental abrasive cleaning surface.

None of the above inventions and patents, taken either singularly or in combination, is seen to describe the instant invention as claimed. Thus a brush for canopy/cab truck windows solving the aforementioned problems is desired.

SUMMARY OF THE INVENTION

The present invention is adapted to reach within and clean the narrow spaces found on trucks, pick-ups, utility and other vehicles with canopies. Although intended for vehicles with canopies, the invention is well suited for cleaning other surfaces where access to a surface between tight spaces is required.

The invention comprises a cylindrical brush head with bristles of a diameter adapted to fit within the narrow space between a truck cab and canopy, and has an elongated handle and offset hand grip. A cloth mitt with a drawstring fits over the bristles, and is tied below the brush head for those applications requiring a less abrasive cleaning surface.

Accordingly, it is a principal object of the invention to provide a cleaning device to clean the window surfaces within the narrow spaces defined by a truck cab and its adjacent canopy, for example.

It is another object of the invention to provide a cleaning device of the aforementioned nature with an ergonomic offset hand grip enabling a user to clean surfaces with less strain on the user's wrist.

It is another object of the invention to provide an cleaning device of the aforementioned nature with an offset hand grip which efficiently directs sufficient pressure upon surfaces to dislodge dirt.

Still another object of the invention to provide a brush with a cloth mitt to extend the functionality of the brush to clean surfaces requiring a milder cleaning surface than brush bristles.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
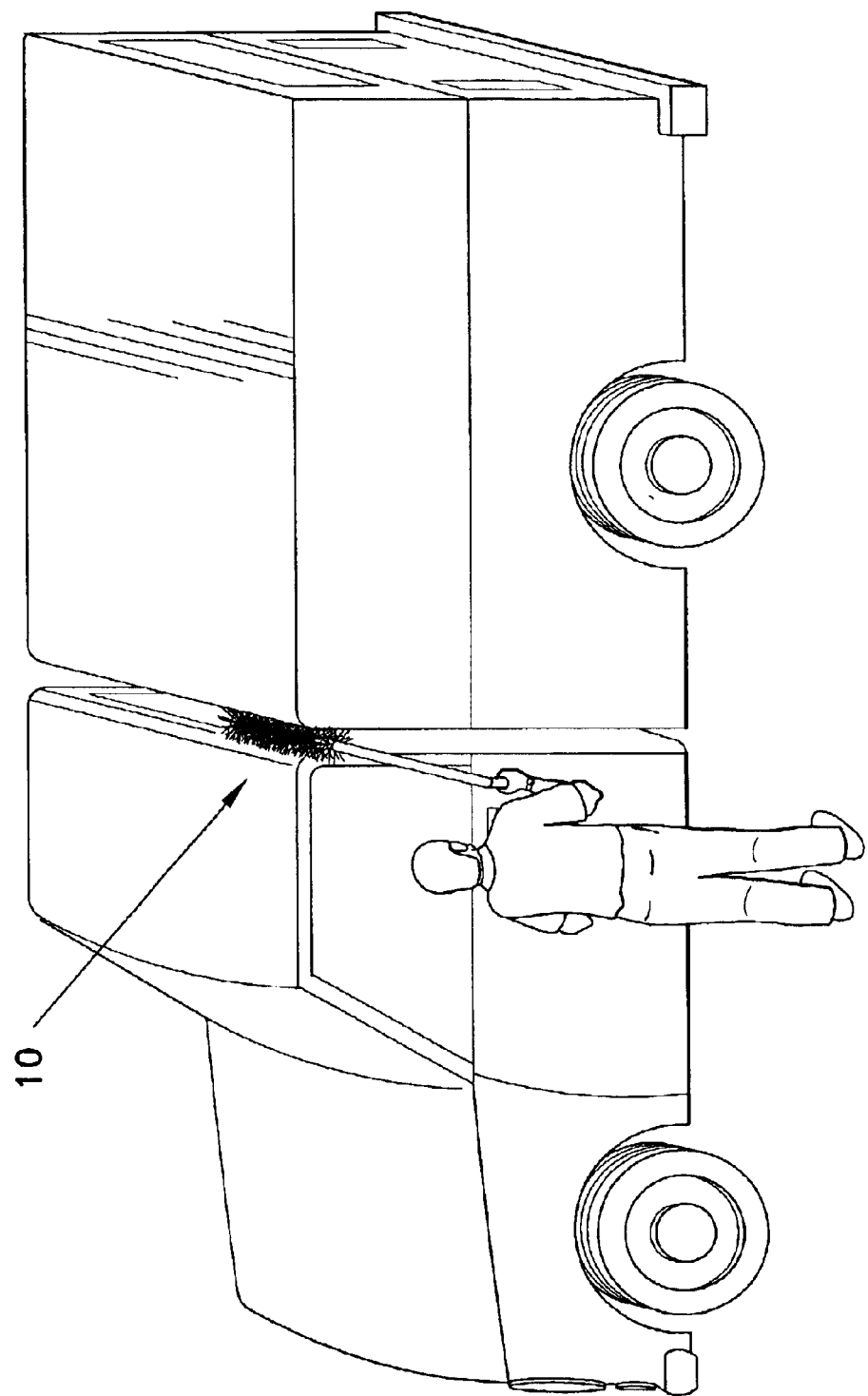
FIG. 1 is an environmental, perspective view of a brush for cleaning canopy/cab truck windows according to the present invention.
Figure 2:
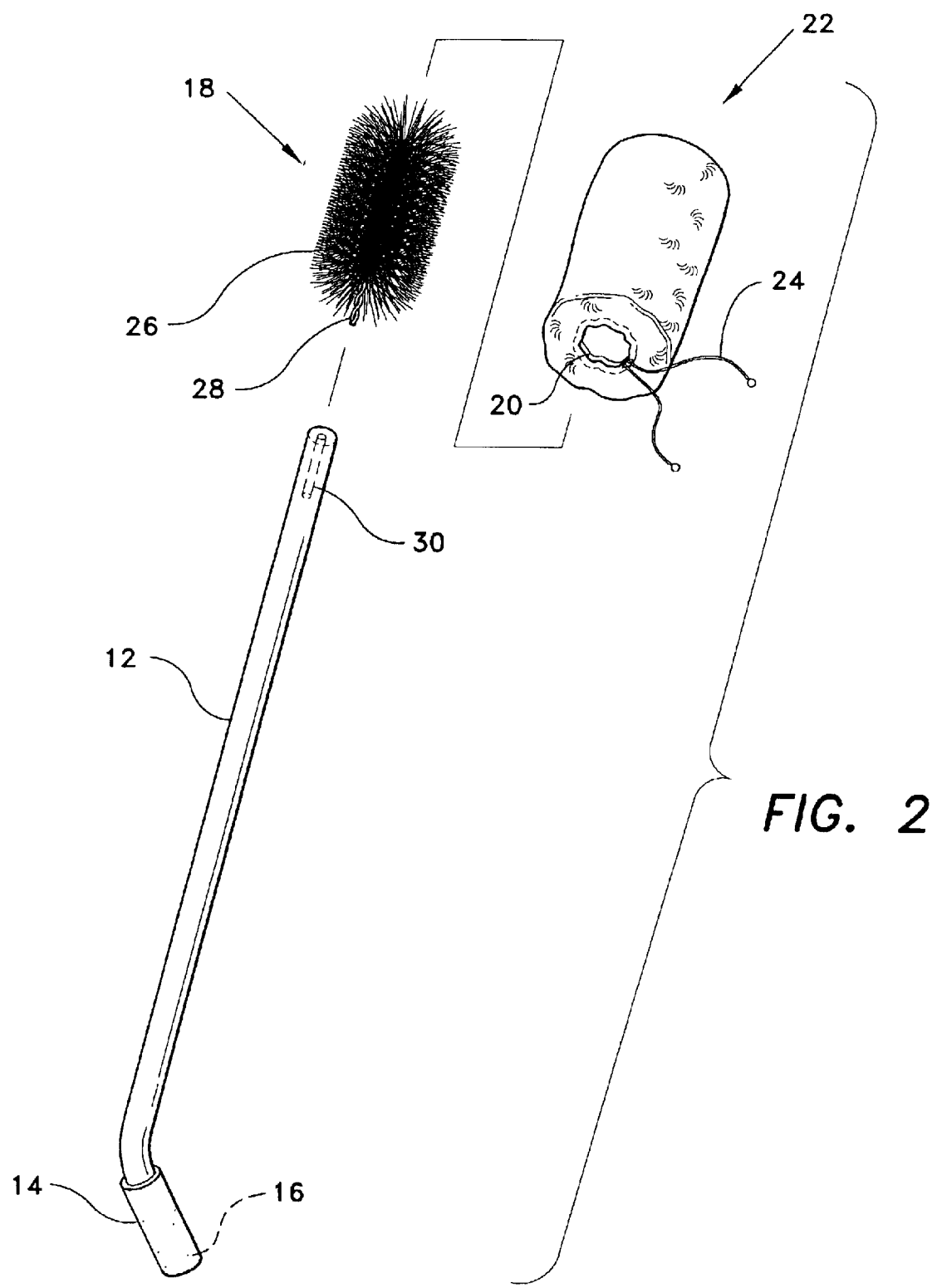
FIG. 2 is an enlarged scale, exploded perspective view of the cleaning device shown in FIG. 1.

FIG. 1 illustrates the window cleaning device 10, inserted between the canopy and the rear cab window of a truck. As shown in FIG. 2, the device is comprised of an elongated rod 12, a cylindrical brush head 18, and a wash mitt cover 22. The rod 12, approximately 3'6" long, is made of a resilient material such as Delrin® (a synthetic resinous plastic material). The proximate end 16 of the rod 12 is offset approximately 45° and is covered by a cushioned hand grip 14 providing an comfortable grip for operating the device. The distal end of the rod 12 has a cavity 30 adapted to receive the stem 28 of the brush head 18.

Figure 3:
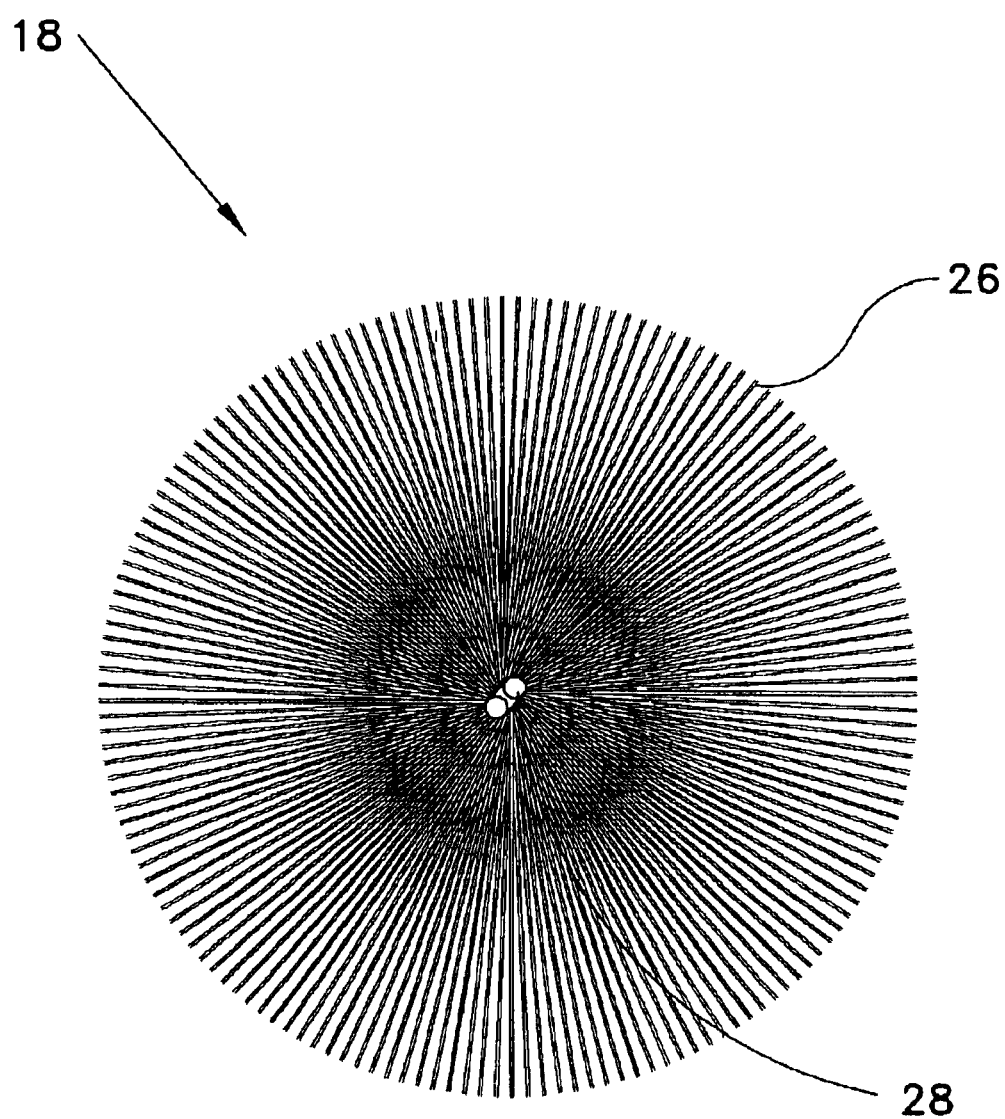
FIG. 3 is an enlarged scale, bottom view of the brush as shown in FIG. 2.

In a preferred embodiment, the cylindrical brush head 18 is approximately 6" long, 3" in diameter and consists of bristles 26 retained by a twisted wire core, the preferred bristle material being nylon, the bristles being approximately 0.012" in diameter. A stem 28 extending from the brush head 18 is friction-fit into a cavity 30 in the distal end of the rod 12. The stem 28 may be further secured in place by glue or the equivalent. The bottom of the brush head is shown in FIG. 3.

The wash mitt cover 22, made of a material such as Wooltex® (a wool-like, textured material, for example), is in the shape of a tubular sleeve closed at one end. The cover 22 slides over the length of the brush head 18 and is secured in place by a fastener such as a drawstring 24 retained in a rolled edge at the mouth 20 of the cover 22.

It is to be understood that the present invention is not limited to the embodiment described above, but encompasses any and all embodiments within the scope of the following claims.

I claim:

1. A brush for canopy/cab truck windows comprising:

an elongated rod made of resilient material with a proximate end and a distal end, and having a cushioned hand grip at said rod proximate end;

a straight cylindrical brush head;

an attachment means for fixing said brush head to said distal end of the rod;

a rigid and fixed bend of approximately 45° formed in said rod proximate end, adjacent said hand grip, for rotating said handle and thus said brush together with said handle, and;

a wash mitt cover comprising a tubular sleeve having an open mouth for receiving the brush head, the cover being made from a pile material, the cover further including a drawstring closure at said open mouth.

2. The brush according to claim 1, wherein said resilient rod is made of a synthetic resinous plastic material.

* * * * *